US010495351B2

(12) United States Patent
Kuroda (10) Patent No.: US 10,495,351 B2
(45) Date of Patent: Dec. 3, 2019

(54) TWO-STAGE PRESSURE BUILDUP REFRIGERATION CYCLE APPARATUS

(71) Applicant: DENSO CORPORATION, Kariya, Aichi-pref. (JP)

(72) Inventor: Yasutaka Kuroda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 15/504,033

(22) PCT Filed: Aug. 28, 2015

(86) PCT No.: PCT/JP2015/004365
§ 371 (c)(1),
(2) Date: Feb. 15, 2017

(87) PCT Pub. No.: WO2016/035302
PCT Pub. Date: Mar. 10, 2016

(65) Prior Publication Data
US 2017/0254569 A1 Sep. 7, 2017

(30) Foreign Application Priority Data

Sep. 5, 2014 (JP) .................................. 2014-181583

(51) Int. Cl.
*F25B 1/10* (2006.01)
*F25B 1/00* (2006.01)
(Continued)

(52) U.S. Cl.
CPC ................. *F25B 1/10* (2013.01); *F25B 1/00* (2013.01); *F25B 9/10* (2013.01); *F25B 49/022* (2013.01);
(Continued)

(58) Field of Classification Search
CPC .. F25B 1/00; F25B 1/10; F25B 49/022; F25B 49/027; F25B 49/025; F25B 9/10;
(Continued)

(56) References Cited

U.S. PATENT DOCUMENTS 5,263,335 A * 11/1993 Isono .................... F24F 11/0009
62/209
2006/0168986 A1   8/2006 Saitoh et al.
2013/0104584 A1 *  5/2013 Takizawa ................. F25B 1/10
62/228.1

FOREIGN PATENT DOCUMENTS

JP    S61173060 A    8/1986
JP    H10096548 A    4/1998
(Continued)

*Primary Examiner* — Edward F Landrum
*Assistant Examiner* — Chang H. Park
(74) *Attorney, Agent, or Firm* — Harness, Dickey & Pierce, P.L.c.

(57) ABSTRACT

A two-stage pressure buildup refrigeration cycle apparatus has a low-pressure side compressor, a high-pressure side compressor, and a controller. The controller controls, for improving a COP, the low-pressure side compressor and the high-pressure side compressor in a COP improving operation mode in which a refrigerant discharge capacity of one of the low-pressure side compressor and the high-pressure side compressor is set based on a refrigerant discharge capacity of an other of the low-pressure side compressor and the high-pressure side compressor, when a required level of a refrigeration performance is low. The controller controls the low-pressure side compressor and the high-pressure side compressor in a high performance operation mode in which a refrigerant discharge capacity of the high-pressure side compressor is increased after increasing a refrigerant discharge capacity of the low-pressure side compressor, when the required level of the refrigeration performance is high.

10 Claims, 8 Drawing Sheets (51) Int. Cl.
*F25B 9/10* (2006.01)
*F25B 49/02* (2006.01)

(52) U.S. Cl.
CPC .......... *F25B 49/027* (2013.01); *F25B 49/025* (2013.01); *F25B 2400/13* (2013.01); *F25B 2600/111* (2013.01); *F25B 2700/21161* (2013.01); *F25B 2700/21172* (2013.01); *Y02B 30/743* (2013.01)

(58) Field of Classification Search
CPC .. F25B 2700/21172; F25B 2700/21161; F25B 2400/13; F25B 2600/111; F25B 2600/02; F25B 2500/07; F25B 2500/08; F25B 2700/1931; Y02B 30/743; F24F 11/86
See application file for complete search history.

(56) References Cited

FOREIGN PATENT DOCUMENTS

| | | | | |
|---|---|---|---|---|
| JP | 2006213345 A | * | 8/2006 | ........... B67D 1/0031 |
| JP | 2006213345 A | | 8/2006 | |
| JP | 2006258397 A | * | 9/2006 | |
| JP | 2006258397 A | | 9/2006 | |
| JP | 2007298188 A | | 11/2007 | |
| JP | 2008249184 A | * | 10/2008 | |
| JP | 2008249184 A | | 10/2008 | |
| WO | WO-2012004987 A1 | | 1/2012 | |

* cited by examiner

TWO-STAGE PRESSURE BUILDUP REFRIGERATION CYCLE APPARATUS

CROSS REFERENCE TO RELATED APPLICATIONS

This application is a U.S. National Phase Application under 35 U.S.C. 371 of International Application No. PCT/JP2015/004365 filed on Aug. 28, 2015 and published in Japanese as WO 2016/035302 A1 on Mar. 10, 2016. This application is based on and claims the benefit of priority from Japanese Patent Application No. 2014-181583 filed on Sep. 5, 2014. The entire disclosures of all of the above applications are incorporated herein by reference.

TECHNICAL FIELD

The present disclosure relates to a two-stage pressure buildup refrigeration cycle apparatus that includes a low-pressure side compression mechanism and a high-pressure side compression mechanism and increases pressure of refrigerant in multiple stages.

BACKGROUND ART

For example, Patent Literature 1 describes a two-stage pressure buildup refrigeration cycle apparatus. In Patent Literature 1, in a cycle using a plurality of compressors, refrigerant discharge capacity of a high-pressure side compression mechanism and refrigeration discharge capacity of a low-pressure side compression mechanism can be controlled independently of each other. The refrigeration discharge capacity of the low-pressure side compression mechanism is determined based on an atmospheric temperature, an air temperature, and a set temperature. The refrigerant discharge capacity of the high-pressure side compression mechanism is determined so that an effective capacity ratio is in a range of 1 to 3, based on the determined refrigerant discharge capacity of the low-pressure side compression mechanism. In this way, a COP of the two-stage pressure buildup refrigeration cycle apparatus is improved with a simple configuration and control.

PRIOR ART LITERATURES

Patent Literature

Patent Literature 1: Re-publication of PCT International Publication No. WO2012/004987

SUMMARY OF INVENTION

However, according to studies by the inventor of the present disclosure, there is a case that a refrigerant discharge capacity is required to be maximized even if an improvement of the COP is disregarded, for the following reasons.

The first case is a case that the refrigeration performance is insufficient since a capacity of a container is large. A capacity of a land container having a longitudinal length of 53 ft is greater than a capacity of a marine container having a longitudinal length of 49 ft, and therefore a refrigeration performance may be insufficient when reloading of goods. The second case is a case where there is a possibility that the goods are damaged because the refrigeration performance is insufficient when reloading the goods. The third case is a case that a required performance cannot be excreted because the refrigeration performance is insufficient while a required level of the refrigeration performance is high.

However, a discharge temperature may exceed a specified upper limit temperature that is set in advance, and a restriction condition in which an excess current flows in a motor and affects a current protection may be met in a process maximizing the refrigerant discharge capacity. In such a case, a required refrigerant discharge capacity may not be secured.

It is an objective of the present disclosure to provide a two-stage pressure buildup refrigeration cycle apparatus that can exert a required level of a refrigeration performance as required and promptly.

A two-stage pressure buildup refrigeration cycle apparatus according to the present disclosure has a low-pressure side compressor, a high-pressure side compressor, a condenser, a main expansion valve, an auxiliary expansion valve, an evaporator, a condenser fan, and a controller.

The low-pressure side compressor compresses a low-pressure refrigerant to be an intermediate-pressure refrigerant and discharges the low-pressure refrigerant. The high-pressure side compressor compresses the intermediate-pressure refrigerant discharged from the low-pressure side compressor to be a high-pressure refrigerant and discharges the high-pressure refrigerant. The condenser performs a heat exchange between the high-pressure refrigerant discharged from the high-pressure side compressor and outside air, and induces the high-pressure refrigerant to radiate heat. The main expansion valve decompresses and expands the high-pressure refrigerant, which flows out of the condenser after radiating heat, to be the low-pressure refrigerant. The auxiliary expansion valve decompresses the high-pressure refrigerant, which flows out of the condenser after radiating heat, and guides the refrigerant to a suction side of the high-pressure side compressor. The evaporator performs a heat exchange between the low-pressure refrigerant decompressed in the main expansion valve and blown air to be blown into an interior as a cooling target space, evaporates the low-pressure refrigerant, and guides the low-pressure refrigerant to flow to a suction side of the low-pressure side compressor. The condenser fan blows the outside air toward the condenser. The evaporator fan blows air for cooling the interior toward the evaporator. The controller controls the low-pressure side compressor, the high-pressure side compressor, the condenser fan, and the auxiliary expansion valve.

The controller controls, for improving a COP, the low-pressure side compressor and the high-pressure side compressor in a COP improving operation mode in which a refrigerant discharge capacity of one of the low-pressure side compressor and the high-pressure side compressor is set based on a refrigerant discharge capacity of another of the low-pressure side compressor and the high-pressure side compressor, when a required level of a refrigeration performance is low.

The controller controls the low-pressure side compressor and the high-pressure side compressor in a high performance operation mode in which a refrigerant discharge capacity of the high-pressure side compressor is increased after increasing a refrigerant discharge capacity of the low-pressure side compressor, when the required level of the refrigeration performance is high.

According to the present disclosure, the COP improving operation mode and the high performance operation mode can be switched depending on the required level of the refrigeration performance. In addition, the refrigeration cycle apparatus having the low-pressure side compressor and the high-pressure side compressor increases the refrigerant discharge capacity of the low-pressure side compressor and the refrigerant discharge capacity of the high-pressure side compressor in this order in the high performance operation mode. As a result, the refrigerant discharge capacity affecting a refrigeration performance can be increased promptly, and thereby the interior can be cooled promptly.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. In the embodiments, a part that corresponds to or equivalents to a matter described in a preceding embodiment may be assigned with the same reference number, and descriptions of the part may be omitted. When only a part of a configuration is described in an embodiment, parts described in preceding embodiments may be applied to the other parts of the configuration.

The parts may be combined even if it is not explicitly described that the parts can be combined. The embodiments may be partially combined even if it is not explicitly described that the embodiments can be combined, provided there is no harm in the combination.

First Embodiment

Figure 1:
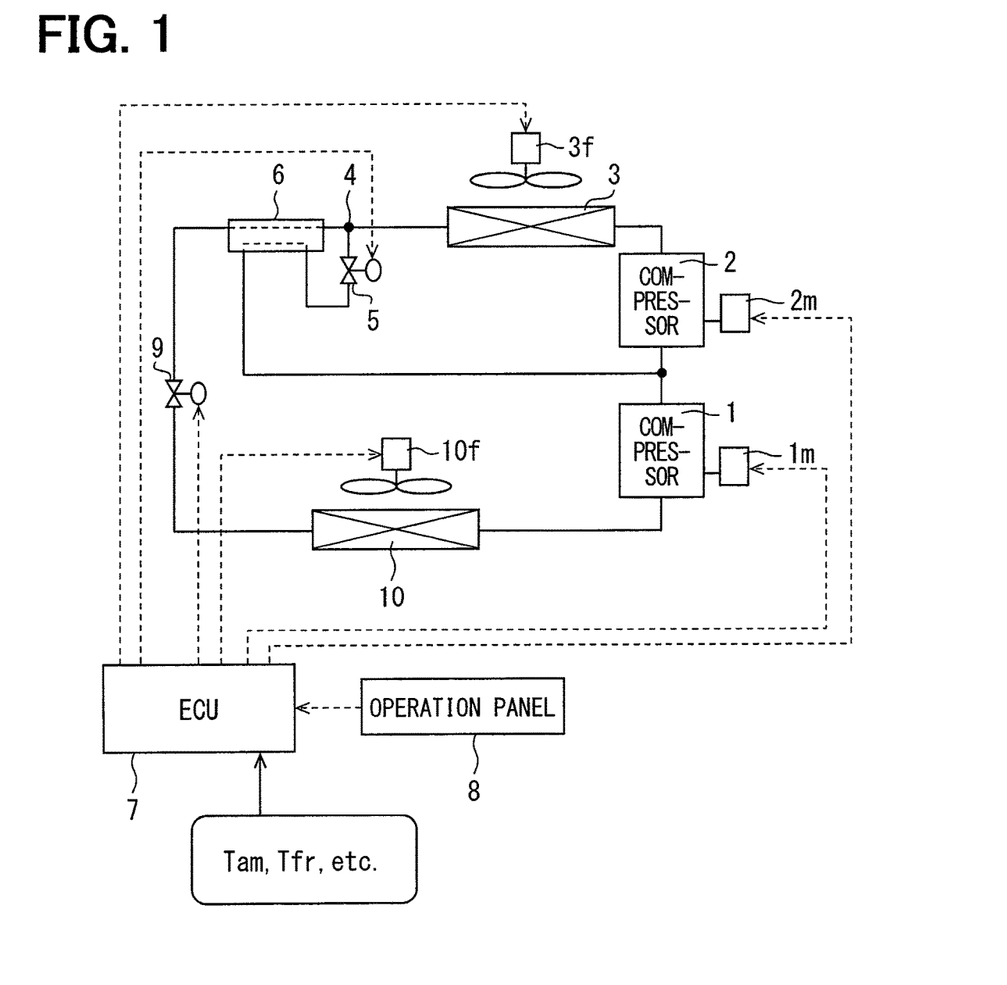
FIG. 1 is an overall configuration diagram of a two-stage pressure buildup refrigeration cycle apparatus in a first embodiment.

A first embodiment will be described below in detail with reference to FIGS. 1 to 5 and effects will be described with reference to FIG. 6. FIG. 1 shows a two-stage pressure buildup refrigeration cycle apparatus in the present disclosure. The refrigeration cycle device includes two compressors, i.e., a low-pressure side compressor 1 and a high-pressure side compressor 2 which are controlled so that a discharge flow rate of the low-pressure side compressor 1 is gradually increased to reach a maximum rate and that a discharge flow rate of the high-pressure side compressor 2 is increased afterwards.

Refrigeration performance depends on a refrigerant flow rate and a difference between an enthalpy at an inlet of an evaporator and an enthalpy at an outlet of the evaporator relate. In other words, the enthalpy relates to an amount of energy of the refrigerant. The larger the difference between the enthalpy at the inlet of the evaporator and the enthalpy at the outlet of the evaporator, the larger an amount heat exchange with air by the evaporator becomes and the larger the refrigeration performance becomes. In general, the refrigeration performance Q corresponds to a product of the refrigerant flow rate Gr and the above-described difference $\Delta ie$ in enthalpy.

Figure 5:
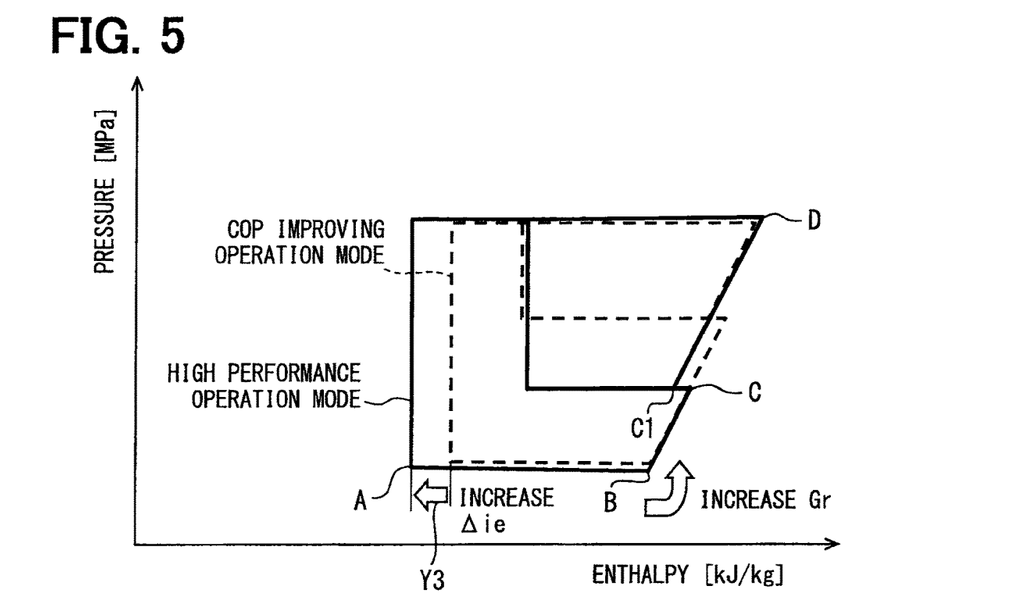
FIG. 5 is a Mollier diagram of the two-stage pressure buildup refrigeration cycle apparatus in the above-described embodiment.
Figure 6:
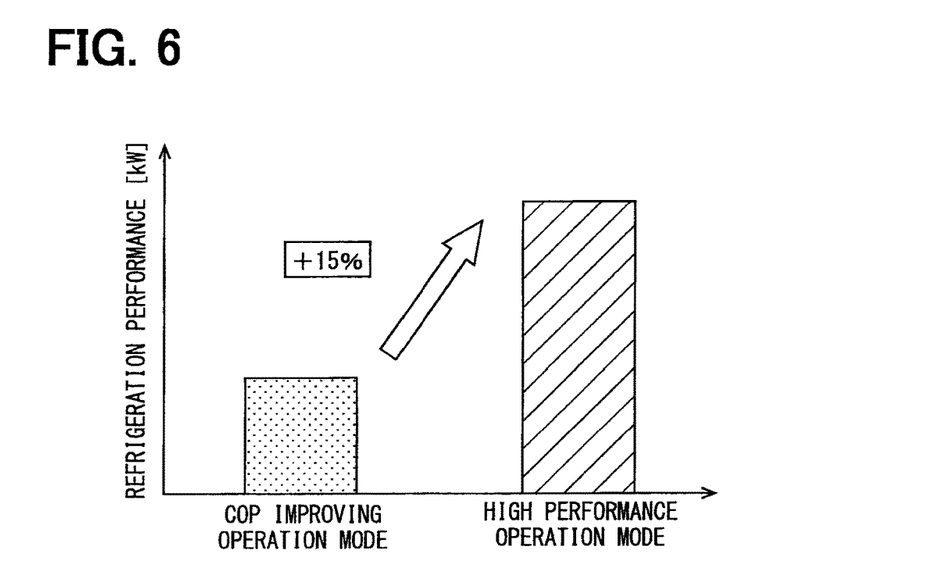
FIG. 6 is an explanatory diagram showing effects of the above-described embodiment.

FIG. 5 is a Mollier diagram of the device in FIG. 1. As shown in FIG. 5, a state of the refrigerant in the refrigeration cycle apparatus shown in FIG. 1. In the diagram, the difference between the enthalpy at the inlet of the evaporator and the enthalpy at the outlet of the evaporator corresponds to a length between point A and point B. That is, an enthalpy difference $\Delta ie$ between the inlet of the evaporator and the outlet of the evaporator increases for an increase of the enthalpy shown by an arrow Y3.

In FIG. 5, a Mollier diagram in a COP improving operation mode is shown by a broken line. The COP improving operation mode is an operation mode, for improving the COP, in which a refrigerant discharge capacity of one compressor of the low-pressure side compressor 1 and the high-pressure side compressor 2 is set based on a refrigerant discharge capacity of the other compressor of the low-pressure side compressor 1 and the high-pressure side compressor 2. In the COP improving operation mode, an amount of heat exchange in an intermediate heat exchanger (described later) is small. On the other hand, an operation mode of the present embodiment is a high performance operation mode shown by a solid line, and the increase of the enthalpy difference $\Delta ie$ shown by the arrow Y3 and an increase of the refrigerant flow rate Gr contribute to an improvement of the refrigeration performance.

In FIG. 1, refrigerant after heat radiation at an outlet of a condenser 3 is divided at a branch portion 4 and an auxiliary expansion valve 5 throttles the refrigerant. The throttled refrigerant and the refrigerant at the outlet of the condenser 3 exchange heat with each other in the intermediate heat exchanger 6. In this way, the refrigerant at the outlet of the condenser 3 is cooled and the refrigerant which has passed through the auxiliary expansion valve 5 is warmed.

Since the refrigerant which has passed through the auxiliary expansion valve joins, the enthalpy on a suction side of the high-pressure side compressor 2 reduces to produce a step portion C-C1 in the Mollier diagram in FIG. 5. Then, after the step portion C-C1, the refrigerant is increased in pressure in the high-pressure side compressor 2. In the present embodiment, a compression amount C1-D in the high-pressure side compressor 2 is large.

The refrigerant flow rate Gr of the refrigerant flowing in the evaporator 10 and the enthalpy difference $\Delta ie$ are a factor determining the refrigerant performance, however the refrigerant flow rate Gr has a higher sensitivity in an improvement of the refrigeration performance since the refrigerant flow rate Gr directly affects an increase of the refrigerant discharge capacity. That is, a response for improving the refrigeration performance is quick when using the refrigerant flow rate Gr, and thereby an interior of a container can be cooled promptly.

The increase in the difference Δie in the enthalpy can be obtained as a result of increase of a heat exchange amount of the intermediate heat exchanger 6 and therefore occurs after a time lag as compared to the refrigerant flow rate Gr. Therefore, in the first embodiment, the refrigerant discharge capacity of the low-pressure side compressor 1 is increased to increase the refrigerant flow rate Gr first. Then, after the refrigerant discharge capacity of the low-pressure side compressor 1 reaches a maximum value, output of the high-pressure side compressor 2 is increased.

As the container the inside of which is to be cooled by the refrigeration device, there are a marine container and an inland container. When goods are moved from the marine container having a relatively large inside capacity into the inland container or when goods are unloaded from or loaded into the container, operation which gives a priority to increase of the refrigeration performance may be preferred to operation which gives a priority to efficiency in some cases.

Figure 2:
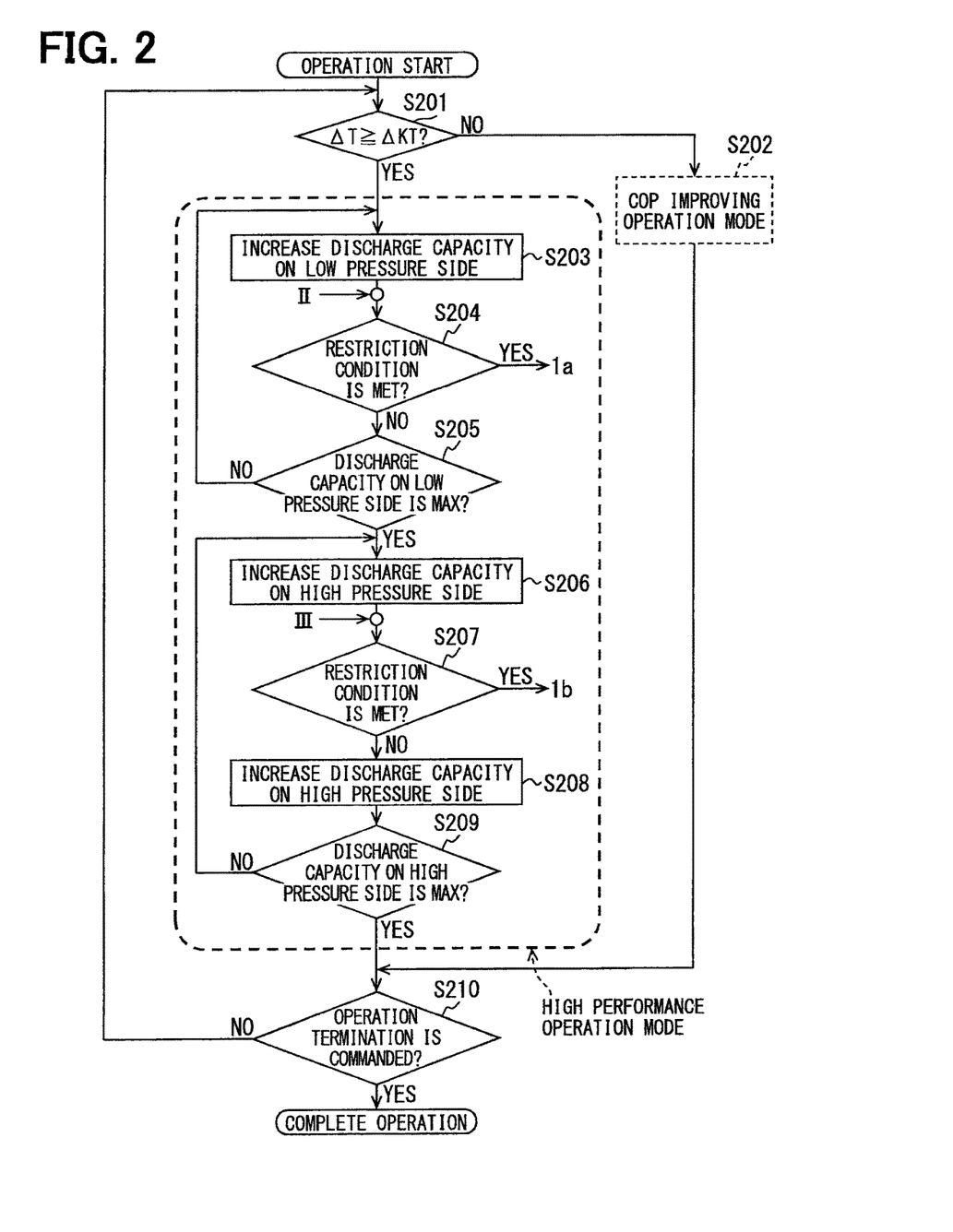
FIG. 2 is a flowchart showing control by a controller in the first embodiment.

In FIG. 1, the refrigeration cycle device is controlled by an ECU serving as a controller 7. The controller 7 receives operation signals from an operation panel 8 positioned on a refrigerator main body or in a driver's seat, for example. FIG. 2 shows a flowchart of control by the controller 7.

A priority is given to an increase of the refrigerant flow rate Gr having a great response, in a control for improving the refrigeration performance among controls performed by the controller 7. Accordingly, the flow rate of the low-pressure side compressor 1 is increased first. When the control shown in FIG. 2 is started, an absolute value of a temperature deviation ΔT between an inside temperature and a target temperature is compared, at S201, with a reference temperature deviation ΔKT set in advance. A prompt increase of the refrigeration performance is not required when the absolute value of the temperature deviation ΔT between the inside temperature and the target temperature is relatively small and is not higher than the reference temperature deviation ΔKT. Accordingly, the control flow advances to S202, and a control in the COP improving operation mode is performed.

Only a brief summary of the two-stage pressure buildup refrigeration cycle apparatus in the control will be given. The two-stage pressure buildup refrigeration cycle apparatus that performs control includes the low-pressure side compressor 1 that compresses a low-pressure refrigerant to be an intermediate-pressure refrigerant and discharges the low-pressure refrigerant and the high-pressure side compressor 2 that compresses the intermediate-pressure refrigerant discharged from the low-pressure side compressor 1 to be a high-pressure refrigerant and discharges the high-pressure refrigerant as shown in FIG. 1.

The two-stage pressure buildup refrigeration cycle apparatus further includes the condenser 3, the auxiliary expansion valve (i.e., an intermediate-pressure expansion valve) 5, a main expansion valve (i.e., a low-pressure expansion valve) 9, and the evaporator 10. The condenser 3 is a heat radiator that performs a heat exchange between the high-pressure refrigerant discharged from the high-pressure side compressor 2 and the outside air. The auxiliary expansion valve 5 decompresses and expands the high-pressure refrigerant, which flows out of the condenser 3, to be the intermediate-pressure refrigerant and leads the refrigerant to the suction side of the high-pressure side compressor 2. The main expansion valve 9 decompresses and expands the high-pressure refrigerant, which flows out of the condenser 3, to be the low-pressure refrigerant. The evaporator 10 exchanges heat between the low-pressure refrigerant decompressed and expanded by the main expansion valve 9 and blown air blown into a space to be cooled, evaporates the refrigerant, and causes the refrigerant to flow into a suction side of the low-pressure side compressor 1.

The controller 7 of the two-stage pressure buildup refrigeration cycle apparatus in FIG. 1 has a first discharge capacity control section and a second discharge capacity control section. The first discharge capacity control section determines to increase the refrigeration discharge capacity of one of the high-pressure side compressor 2 and the low-pressure side compressor 1 as one of an outside air temperature and a temperature of the blown air used for the heat exchange in the evaporator 10 increases.

Based on the refrigerant discharge capacity of a compression mechanism of one of the low-pressure side compressor 1 and the high-pressure side compressor 2, the second discharge capacity control section determines the refrigerant discharge capacity of the other. The COP improving operation mode in the present disclosure is the operation mode for determining, based on the refrigerant discharge capacity of the one compressor, the refrigerant discharge capacity of the other compressor so as to improve the COP.

Specifically, the second discharge capacity control section determines the refrigerant discharge capacity of the other compressor so that an effective capacity ratio defined by (N2×V2)/(N1×V1) falls within a predetermined reference range, where a discharge capacity of the high-pressure side compressor 2 is V1, a rotation speed of the high-pressure side compressor 2 is N1, a discharge capacity of the low-pressure side compressor 1 is V2, and a rotation speed of the low-pressure side compressor 1 is N2.

The first discharge capacity control section determines the refrigerant discharge capacity of one of the low-pressure side compressor 1 and the high-pressure side compressor 2, based on at least one of the outside air temperature and the temperature of the conditioned air. Then, the second discharge capacity control section determines the refrigerant discharge capacity of the other compressor based on the refrigerant discharge capacity of the one compressor. Therefore, it is possible to easily determine the refrigerant discharge capacity of each of the compressors to improve the COP.

At this time, the second discharge capacity control section determines the refrigerant discharge capacity of the other compressor so that the effective capacity ratio falls within the predetermined reference range. Therefore, by only setting the reference range suitably, it is possible to substantially bring the intermediate refrigerant pressure close to a value corresponding to a geometric mean of a high-pressure side refrigerant pressure and a low-pressure side refrigerant pressure.

Therefore, it is possible to improve the COP of the two-stage pressure buildup refrigeration cycle apparatus with a simple structure which does not require an expensive pressure detecting portion and with extremely easy control.

Furthermore, a throttle opening degree of the auxiliary expansion valve 5 (i.e., the intermediate-pressure expansion valve) can be set regardless of refrigerant discharge capacities of the low-pressure side compressor 1 and the high-pressure side compressor 2. Accordingly, gas-phase refrigerant flows out of the auxiliary expansion valve 5, and thereby an abnormality of liquid compression in the high-pressure side compressor 2 can be avoided.

The high performance operation mode will be described hereafter. When the absolute value of the temperature deviation ΔT between the inside temperature and the target temperature is relatively large and is determined to be larger than or equal to the reference temperature deviation ΔKT at S201 shown in FIG. 2, the refrigerant discharge capacity of the low-pressure side compressor 1 is increased by one stage (i.e., by a specified capacity) at S203. In this case, a rotation speed is increased when using a fixed capacity compressor, to increase the refrigerant discharge capacity. A capacity is increased by one stage based on a capacity increase signal when using a variable capacity compressor.

Subsequently, it is determined, at S204, whether any restriction condition of restriction conditions in a discharge temperature, a restriction condition in a refrigerant pressure, and a restriction condition in a driving current for an electric compressor is met. For example, the restriction condition in the discharge temperature is determined to be met when the discharge temperature exceeds an upper limit temperature, the restriction condition for the refrigerant pressure is determined to be met when a pressure of the high-pressure refrigerant exceeds an upper limit pressure, and the restriction condition in the driving current for the electric compressor is determined to be met when the driving current for the electric compressor exceeds an upper limit current. An abnormality such as a deterioration of a rubber gasket of the compressor due to an over-high temperature, a leaking of the refrigerant, and a damage of a motor for driving the electric compressor occurs, when the restriction condition is met. Therefore, the restriction condition is required to be dissolved.

Figure 3:
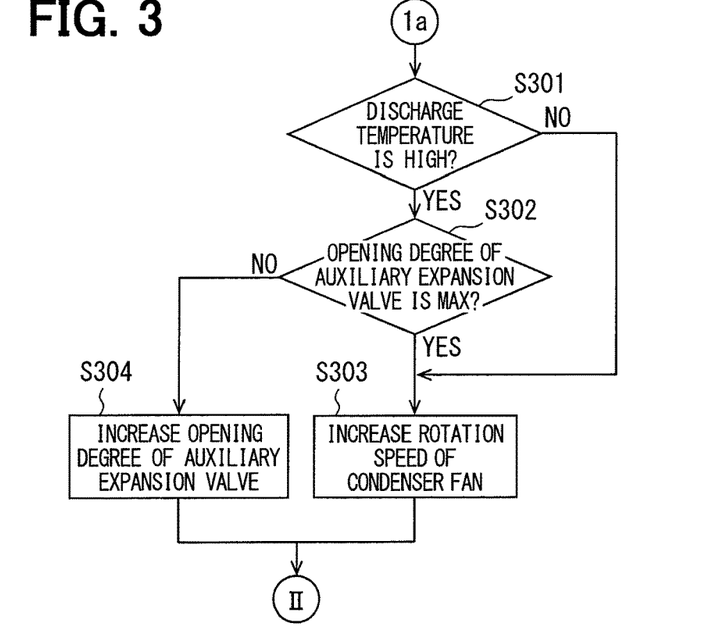
FIG. 3 is a flowchart showing a part of the control for dissolving a restriction condition when the restriction condition is met while a refrigerant discharge capacity of a low-pressure side compressor increasing, according to the first embodiment.

When the restriction condition is determined to be met, the control flow advances to 1a shown in FIG. 3, and the discharge temperature is determined whether to be higher than the specified temperature at S301. A condition that the discharge temperature is not higher than the specified temperature (S301: NO) means that the restriction condition in the refrigerant pressure or the restriction condition in the driving current is met. Accordingly, the control flow advances to S303, and the rotation speed of the condenser fan 3f cooling the condenser 3 is increased by one stage. That is, the rotation speed of the condenser fan 3f is increased to dissolve the restriction condition when a pressure of the high-pressure refrigerant exceeds the upper limit pressure and thereby the restriction condition is met.

Subsequently, the control flow advances from S303 to an upstream side of S204 shown by II in FIG. 2. It is determined again, at S204, whether any restriction condition of the restriction condition in the discharge temperature, the restriction condition in the refrigerant pressure, and the restriction condition in the driving current for the electric compressor is met.

The control flow advances to S302 when the discharge temperature is determined to be higher than the specified temperature at S301 shown in FIG. 3. The rotation speed of the condenser fan 3f is increased at S303 when the opening degree of the auxiliary expansion valve 5 is determined to be the largest degree (i.e., MAX) at S302. When the opening degree of the auxiliary expansion valve 5 is determined not to be the largest degree (i.e., MAX), the opening degree of the auxiliary expansion valve 5 is increased, and he control flow returns to S204 shown in FIG. 2.

The control flow advances to S205 when the restriction condition is not met (S204: NO) as a result of the control shown in FIG. 3 for dissolving the restriction condition. The refrigerant discharge capacity from the low-pressure side compressor 1 is determined whether to be the largest capacity (i.e., MAX) at S205. The control flow returns to S203 to repeat the above-described operations when the refrigerant discharge capacity is not the largest capacity.

The control flow advances to S206 when the refrigerant discharge capacity is determined to be the largest capacity (i.e., MAX). Then, a refrigerant discharge capacity from the high-pressure side compressor 2 is increased by one stage. A rotation speed of the compressor is increased to increase the refrigerant discharge capacity in a case of using a fixed-capacity compressor. A discharge capacity is increased by one stage based on a capacity increase signal to increase the refrigerant discharge capacity in a case of using a variable capacity compressor.

Subsequently, it is determined, at S207, whether any restriction condition of the restriction condition in the discharge temperature, the restriction condition in the refrigerant pressure, and the restriction condition in the driving current for the electric compressor is met. The restriction condition in the discharge pressure is determined, at S207, to be met when the discharge temperature exceeds the upper limit. The restriction condition in the refrigerant pressure is determined to be met when the refrigerant pressure exceeds the upper limit pressure. The restriction condition in the driving current is determined to be met when the driving current for the high-pressure side compressor 2 exceeds the upper limit current.

Figure 4:
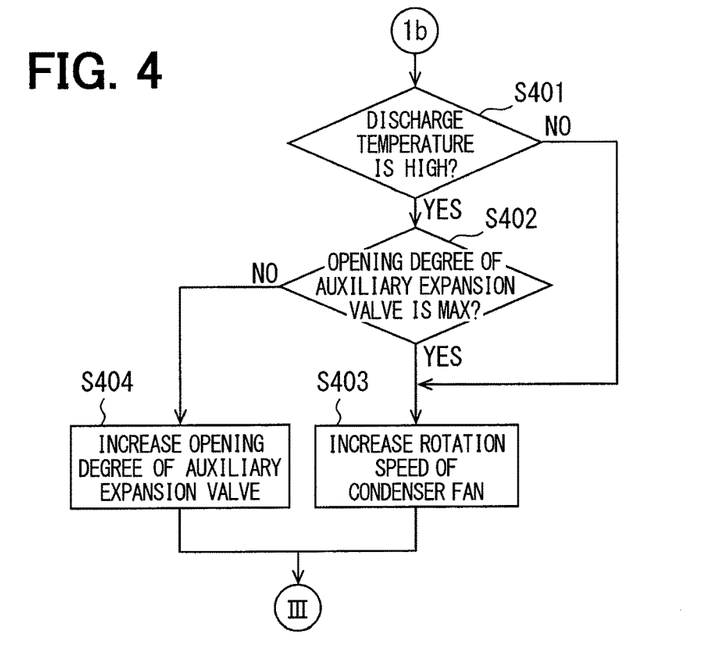
FIG. 4 is a flowchart showing a part of the control for dissolving a restriction condition when the restriction condition is met while a refrigerant discharge capacity of a high-pressure side compressor increasing, according to the first embodiment.

The control flow advances to 1b shown in FIG. 4 when the restriction condition is determined to be met at S207, and the discharge temperature is determined whether to be higher than the specified temperature at S401. When the discharge temperature is determined not to be higher than the specified temperature (S401: NO), the rotation speed of the condenser fan 3f cooling the condenser 3 is increased by one stage at S403. Subsequently, the control flow advances from S403 to an upstream side of S207 shown by III in FIG. 2, and it is determined again, at S207, whether any restriction condition is met.

The control flow advances to S208 when the restriction condition is determined not to be met (S207: NO) as a result of the control shown in FIG. 4 for dissolving the restriction condition. Then, the refrigerant discharge capacity of the high-pressure side compressor 2 is increased. Subsequently, the refrigerant discharge capacity of the high-pressure side compressor 2 is determined whether to be the largest capacity (i.e., MAX) at S209. The control flow returns to S206 and the above-described operations are repeated when the refrigerant discharge capacity is not the largest capacity. When the refrigerant discharge capacity of the high-pressure side compressor 2 is determined to be the largest capacity (i.e., MAX), it is determined, at S210, whether an operation termination is commanded. The control flow returns to S201 when it is determined the operation termination is not commanded. The operation is completed when the operation termination is commanded.

At S401 in FIG. 4, it is determined whether the discharge temperature is higher than the specified temperature. When it is determined that the discharge temperature is higher than the specified temperature, the control flow advances to S402, and the opening degree of the auxiliary expansion valve 5 is determined whether to be the maximum degree (i.e., MAX). When the opening degree of the auxiliary expansion valve 5 is the maximum degree (i.e., MAX), the rotation speed of the condenser fan 3f is increased at S403.

When the opening degree of the auxiliary expansion valve 5 is determined, at S402, not to be the maximum degree (i.e., MAX), the control flow advances to S404, and the opening degree of the auxiliary expansion valve 5 is increased by one stage.

Subsequently, the control flow advances to an upstream side of S207 shown by III in FIG. 2, and it is determined again, at S207, whether any restriction condition of the restriction condition in the discharge temperature, the restriction condition in the refrigerant pressure, and the restriction condition in the driving current for the electric compressor is met.

In this manner, the refrigerant discharge capacity of the high-pressure side compressor is increased. When the refrigerant discharge capacity of the high-pressure side compressor 2 is determined to be the largest capacity (i.e., MAX) at S209, it is determined, at S210, whether the operation determination is commanded. The operation is completed when the operation termination is commanded.

The control flow returns to S201 when the operation termination is not commanded. According to the control of the first embodiment, it is determined that a high performance is required to cool the interior promptly, when an absolute value of the deviation $\Delta T$ between the inside temperature in the interior and the target temperature is greater than or equal to the reference temperature deviation $\Delta KT$ set in advance. On the other hand, the COP improving operation mode is set to give priority to efficiency when the deviation $\Delta T$ is smaller than the reference temperature deviation $\Delta KT$, i.e., in a condition that the inside temperature in the interior approaches a set temperature.

The refrigerant discharge capacity is increased in order from a low pressure side when the high performance operation mode is set. When the restriction condition is met in the high performance operation mode, the restriction condition is dissolved such that the refrigerant discharge capacity of the compressor can be increased.

In a case of dissolving the restriction condition, the opening degree of the auxiliary expansion valve 5 is increased, or the rotation speed of the condenser fan $3f$ is increased, when dissolving the restriction condition in the discharge temperature. The rotation speed of the condenser fan $3f$ is increased when dissolving the restriction condition in the discharge pressure. The rotation speed of the condenser fan $3f$ is increased when dissolving the restriction condition in the driving current for the electric compressor.

In the Mollier diagram in FIG. 5, when the compression amount (length C1-D) of the high-pressure side compressor is increased, a compression amount (length B-C) of the low-pressure side compressor reduces and a temperature of gas-phase refrigerant drawn by the high-pressure side compressor 2 reduces. It is possible to easily obtain the gas-phase refrigerant by heating the gas-phase refrigerant flowing out of the auxiliary expansion valve 5 in the intermediate heat exchanger 6.

The other flow of flows of high-pressure refrigerant divided at the branch portion 4 is cooled to increase the enthalpy difference $\Delta ie$ between the enthalpy of the refrigerant on the inlet side of the evaporator 10 and the enthalpy of the refrigerant on the outlet side of the evaporator 10 to increase the refrigeration performance exerted by the evaporator 10. As a result, it is possible to further improve the refrigeration performance of the two-stage pressure buildup refrigeration cycle apparatus.

Effects obtained by the above-described first embodiment will be described referring to FIG. 6. The control in the high performance operation mode from S203 through S209 shown in FIG. 2 can increase the refrigeration performance by about 15% as compared to the COP improving operation mode of S202 shown in FIG. 2.

The operation which gives the priority to the increase of the refrigeration performance (i.e., rapid cooling) may be preferred to the operation which gives the priority to the efficiency in some cases. For example, when goods are moved from the marine container having a relatively large inside capacity into the inland container or when goods are unloaded from or loaded into the container, the increase in the refrigeration performance is desired. In the first embodiment, it is possible to satisfy the need for rapid cooling.

In the first embodiment, the auxiliary expansion valve 5 decompresses and expands the one flow of the flows of high-pressure refrigerant divided at the branch portion 4, where the flow of the high-pressure refrigerant flowing out of the condenser 3 is divided, and guides the refrigerant to the intermediate heat exchanger 6. The main expansion valve 9 decompresses and expands the other flow of the flows of high-pressure refrigerant divided at the branch portion 4. Furthermore, the intermediate heat exchanger 6 performs a heat exchange between the low-pressure refrigerant decompressed and expanded in the auxiliary expansion valve 5 and the other flow of the flows of high-pressure refrigerant divided at the branch portion 4, and guides the high-pressure refrigerant to flow into the suction side of the high-pressure side compressor 2.

In this way, since the intermediate heat exchanger 6 is provided, it is possible to heat the intermediate-pressure refrigerant flowing out of the auxiliary expansion valve 5 to easily obtain the gas-phase refrigerant to cause the refrigerant to flow into the suction side of the high-pressure side compressor 2. Consequently, it is possible to avoid the liquid compression. As a result, it is possible to enhance reliability of the two-stage pressure buildup refrigeration cycle apparatus. By cooling the other flow of the flows of high-pressure refrigerant divided at the branch portion 4 by use of the low-pressure refrigerant decompressed and expanded by the auxiliary expansion valve 5, the enthalpy of the refrigerant on the inlet side of the evaporator 10 is reduced. In this way, it is possible to increase the enthalpy difference between the enthalpy of the refrigerant on the inlet side of the evaporator 10 and the enthalpy of the refrigerant on the outlet side of the evaporator 10. As a result, it is possible to increase the refrigerant performance exerted by the evaporator 10 and the refrigeration performance of the two-stage pressure buildup refrigeration cycle apparatus can be improved more easily.

As shown in FIG. 2, the controller 7, in the high performance mode, controls the low-pressure side compressor 1 and the high-pressure side compressor 2 to increase a refrigerant discharge capacity of the high-pressure side compressor 2 after increasing a refrigerant discharge capacity of the low-pressure side compressor 1 to be the largest capacity.

Accordingly, the flow rate of the refrigerant flowing into the evaporator 10 is determined depending on the refrigerant discharge capacity of the low-pressure side compressor 1. Therefore, the flow rate of the refrigerant discharged by the low-pressure side compressor 1 is set to be largest (i.e., MAX), and the flow rate of the refrigerant discharged by the high-pressure side compressor 2 is increased subsequently. As a result, a response for improving the refrigeration performance can be improved by increasing the flow rate of the refrigerant flowing into the evaporator 10, and thereby the interior can be cooled quickly.

Moreover, the controller 7 determines, at S201, whether an absolute value of the temperature deviation $\Delta T$ between the air temperature Tfr in the interior that is a cooling target space to be cooled and the target cooling temperature Tset in the interior is smaller than the reference temperature deviation ΔKT. The low-pressure side compressor 1 and the high-pressure side compressor 2 are operated in the COP improving operation mode when the absolute value is smaller than the reference temperature deviation ΔKT. On the other hand, the low-pressure side compressor 1 and the high-pressure side compressor 2 are operated in the high performance operation mode when the absolute value is larger than or equal to the reference temperature deviation ΔKT.

Accordingly, a prompt cooling performance is not necessary when the absolute value is smaller than the reference temperature deviation ΔKT. Then, the high performance operation mode is stopped, and various controls are performed in the COP improving operation mode. As a result, efficiency can be improved, and energy can be saved. In addition, the high performance operation mode can be operated when the prompt cooling performance is required.

As shown in FIG. 3, according to the present embodiment, the controller 7 increases the rotation speed of the condenser fan 3f or increases the opening degree of the auxiliary expansion valve 5 when any one of the various restriction conditions is met and when a temperature of the high-pressure refrigerant exceeds the upper limit temperature (S301: YES).

The controller increases the rotation speed of the condenser fan 3f when any one of the various restriction conditions is met and when the driving current of the low-pressure side compressor 1 or the high-pressure side compressor 2 exceeds the upper limit current (S301: NO). Accordingly, the restriction condition is dissolved, and thereby the refrigerant discharge capacity can be increased, in a manner that the controller 7 controls the condenser fan 3f and the auxiliary expansion valve 5 when the restriction condition is met.

Second Embodiment

Next, a second embodiment will be described. The first embodiment and the second embodiment are the same as each other in use of the same two-stage pressure buildup refrigeration cycle apparatus and are different from each other in part of the control.

Figure 7:
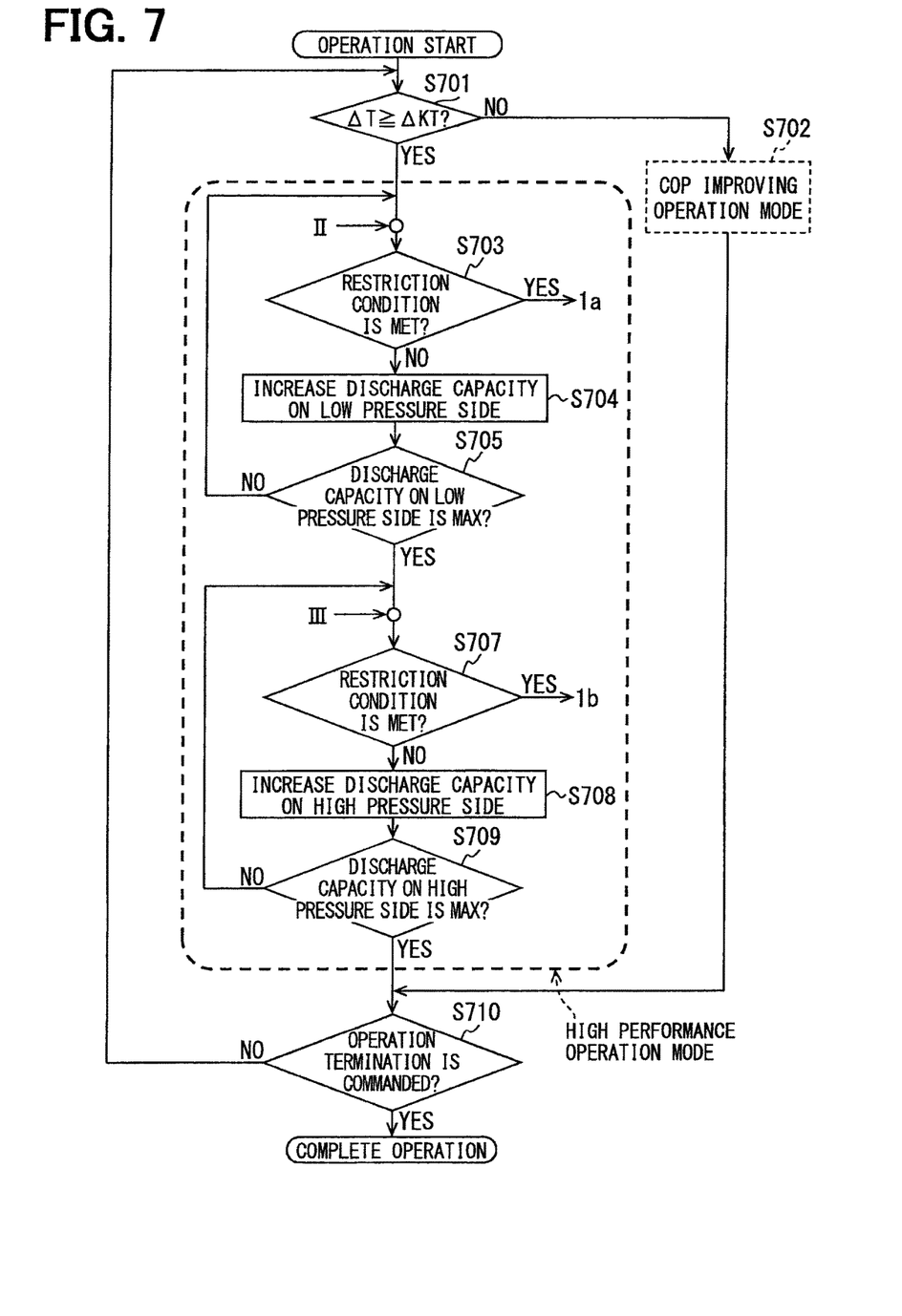
FIG. 7 is a flowchart showing control by a controller in a two-stage pressure buildup refrigeration cycle apparatus in a second embodiment.

With reference to FIG. 7, a brief summary of control by the controller 7 in the second embodiment will be described. As described above, according to the first embodiment shown in FIG. 2, the refrigerant discharge capacity of the low-pressure side compressor 1 is increased at S203, and subsequently the restriction condition is determined, at S204, whether to be met. In addition, the refrigerant discharge capacity of the high-pressure side compressor 2 is increased at S206, and subsequently the restriction condition is determined, at S207, whether to be met. However, according to the second embodiment, the restriction condition is determined whether to be met in advance at S703 and S707, and subsequently the refrigerant discharge capacities are increased at S704 and S708 respectively. A control for dissolving the restriction condition when the restriction condition is met is similar to those shown in FIG. 3 and FIG. 4.

A configuration of the refrigeration cycle apparatus in the second embodiment will be described with reference to FIG. 1 and FIG. 7.

In FIG. 1, the two-stage pressure buildup refrigeration cycle apparatus is applied to a refrigerator and cools blown air to be blown into a refrigerating chamber which is a space to be cooled to an extremely low temperature of about −30° C. to −10° C.

First, as shown in FIG. 1, the two-stage pressure buildup refrigeration cycle apparatus includes two compressors, i.e., the high-pressure side compressor 2 and the low-pressure side compressor 1 and increases pressure of refrigerant circulating in the cycle through multiple stages. As the refrigerant, normal fluorocarbon refrigerant (e.g., R404A) may be employed. Moreover, refrigerant oil (i.e., oil) for lubricating sliding portions in the low-pressure side compressor 1 and the high-pressure side compressor 2 is mixed into the refrigerant and a part of the refrigerant oil circulates in the cycle together with the refrigerant.

First, the low-pressure side compressor 1 is an electric compressor including a compressor that compresses a low-pressure refrigerant to be an intermediate-pressure refrigerant, and a low-pressure side electric motor 1m for driving the compressor to rotate. The low-pressure side compressor 1 is formed by a fixed capacity compression mechanism having a fixed discharge capacity V2. Specifically, various kinds of compression mechanisms such as a scroll compression mechanism, a vane compression mechanism, and a rolling piston compression mechanism may be employed.

The low-pressure side electric motor 1m is an AC motor of which operation (i.e., a rotation speed) is controlled by an alternate current output from a low-pressure side inverter. The low-pressure side inverter outputs an alternate current having a frequency corresponding to a control signal output from the controller 7. The refrigerant discharge capacity of the low-pressure side compressor 1 is changed by controlling the frequency.

Therefore, in the second embodiment, the low-pressure side electric motor 1m configures a discharge capacity changing portion of the low-pressure side compressor 1. As the low-pressure side electric motor 1m, a DC brushless motor may be employed. In this case, a rotation speed of the motor is controlled by a control voltage output from the controller 7. To a discharge port of the low-pressure side compressor 1, a suction port side of the high-pressure side compressor 2 is connected.

A basic configuration of the high-pressure side compressor 2 is similar to that of the low-pressure side compressor 1. Therefore, the high-pressure side compressor 2 compresses the intermediate-pressure refrigerant discharged from the low-pressure side compressor 1 to be a high-pressure refrigerant and discharges the high-pressure refrigerant.

Furthermore, the high-pressure side compressor 2 is configured by a fixed-capacity compression mechanism with fixed discharge capacity V1 and a rotation speed of a high-pressure side electric motor 2m is controlled by an alternate current output from a high-pressure side inverter. A compression ratio of the high-pressure side compressor 2 and a compression ratio of the low-pressure side compressor 1 in the present embodiment are substantially equal to each other.

A refrigerant inlet side of a condenser 3 is connected to a discharge port of the high-pressure side compressor 2. The condenser 3 is a heat dissipation heat exchanger that cools the high-pressure refrigerant by performing a heat exchange between the high-pressure refrigerant discharged from the high-pressure side compressor 2 and outside air (i.e., exterior air) blown from a condenser fan 3f such that the high-pressure refrigerant radiates heat.

The condenser fan 3f is an electric blower a rotation speed (blown air amount) of which is controlled by a control voltage output from the controller 7. The two-stage pressure buildup refrigeration cycle apparatus in the second embodiment employs fluorocarbon refrigerant as the refrigerant and configures a subcritical refrigeration cycle in which high-pressure side refrigerant pressure does not exceed critical pressure of the refrigerant. Therefore, the condenser 3 functions as a heat radiator that condenses the refrigerant.

A branch portion 4 where a flow of refrigerant flowing out of the condenser 3 is divided is connected to a refrigerant outlet of the condenser 3. The branch portion 4 in the present embodiment has a three-way joint structure including one refrigerant inflow port and two refrigerant outflow ports. The branch portion 4 may be configured by joining pipes or by providing a plurality of refrigerant passages to a metal block or a resin block.

An inlet side of an auxiliary expansion valve 5 is connected to one of the refrigerant outlets of the branch portion 4 and an inlet side of high-pressure refrigerant flow paths of an intermediate heat exchanger 6 is connected to the other refrigerant outlet. The auxiliary expansion valve 5 is a thermal expansion valve which decompresses and expands the high-pressure refrigerant flowing out of the condenser 3 into an intermediate-pressure refrigerant.

More specifically, the auxiliary expansion valve 5 has a temperature sensor disposed on an outlet side of intermediate-pressure refrigerant flow paths in the intermediate heat exchanger 6. The auxiliary expansion valve 5 senses a degree of superheat of the refrigerant on the outlet side of the intermediate-pressure refrigerant flow paths, based on a temperature and pressure of the refrigerant on the outlet side of the intermediate-pressure refrigerant flow paths. A valve opening degree (i.e., a refrigerant flow rate) is adjusted by a mechanical mechanism so that the degree of superheat becomes equal to a preset value. An inlet side of the intermediate heat exchanger 6 is connected to an outlet side of the auxiliary expansion valve 5.

In the intermediate heat exchanger 6, the intermediate-pressure refrigerant flowing through the intermediate-pressure refrigerant flow paths and decompressed and expanded by the auxiliary expansion valve 5 and the other flow of high-pressure refrigerant flowing through the high-pressure refrigerant flow paths and branching off from the branch portion 4 exchange heat with each other. Since the high-pressure refrigerant reduces in temperature by being decompressed, the intermediate-pressure refrigerant flowing through the intermediate-pressure refrigerant flow paths is heated and the high-pressure refrigerant flowing through the high-pressure refrigerant flow paths is cooled in the intermediate heat exchanger 6.

As a specific structure of the intermediate heat exchanger 6, a plurality of plate-shaped heat conductive plates are laminated to alternately form the intermediate-pressure refrigerant flow paths and the high-pressure refrigerant flow paths between the heat conductive plates. As the intermediate heat exchanger 6, a plate heat exchanger that exchanges heat between the high-pressure refrigerant and the intermediate-pressure refrigerant through heat conductive plates is employed.

It is also possible to employ a double pipe heat exchanger configuration formed by disposing an inner pipe forming an intermediate-pressure refrigerant flow path inside an outer pipe forming a high-pressure refrigerant flow path. It is of course possible to form a high-pressure refrigerant flow path as an inner pipe and an intermediate-pressure refrigerant flow path as an outer pipe. It is also possible to employ a configuration in which refrigerant pipes forming a high-pressure refrigerant flow path and an intermediate-pressure refrigerant flow path are joined to perform heat exchange.

In the intermediate heat exchanger 6 shown in FIG. 1, a parallel flow heat exchanger in which a flow direction of the high-pressure refrigerant flowing through the high-pressure refrigerant flow paths and a flow direction of the intermediate-pressure refrigerant flowing through the intermediate-pressure refrigerant flow paths are the same is employed. However, the intermediate heat exchanger 6 may be a counterflow heat exchanger in which a flow direction of high-pressure refrigerant flowing through high-pressure refrigerant flow paths and a flow direction of intermediate-pressure refrigerant flowing through intermediate-pressure refrigerant flow paths are opposite.

An inlet side of the high-pressure side compressor 2 is connected to the outlet side of the intermediate-pressure refrigerant flow paths of the intermediate heat exchanger 6 via a check valve (not shown). Therefore, the high-pressure side compressor 2 in the present embodiment draws a mixed refrigerant of the intermediate-pressure refrigerant flowing out of the intermediate-pressure refrigerant flow paths and the intermediate-pressure refrigerant discharged from the low-pressure side compressor 1.

On the other hand, an inlet side of a main expansion valve 9 is connected to an outlet side of the high-pressure refrigerant flow paths of the intermediate heat exchanger 6. The main expansion valve 9 is a thermal expansion valve that decompresses and expands the high-pressure refrigerant flowing out of the condenser 3 into a low-pressure refrigerant. A basic configuration of the main expansion valve 9 is similar to that of the auxiliary expansion valve 5.

Specifically, the main expansion valve 9 has a temperature sensor disposed on a refrigerant outlet side of an evaporator 10 (described later) and senses a degree of superheat of the refrigerant on the outlet side of the evaporator 10, based on a temperature and pressure of the refrigerant on the outlet side of the evaporator 10. A valve opening degree (i.e., a refrigerant flow rate) of the main expansion valve 9 is adjusted by a mechanical mechanism so that the degree of superheat becomes equal to a specified value set in advance.

A refrigerant inflow port side of the evaporator 10 is connected to an outlet side of the main expansion valve 9. The evaporator 10 is a heat absorbing heat exchanger that exchanges heat between the refrigerant decompressed and expanded by the main expansion valve 9 and blown air circulated and blown in the refrigerating chamber by an evaporator fan 10$f$ and evaporates the low-pressure refrigerant to thereby exert endothermic effect. The evaporator fan 10$f$ is an electric blower a rotation speed (blown air amount) of which is controlled by a control voltage output from the controller 7. Furthermore, a suction side of the low-pressure side compressor 1 is connected to the refrigerant outflow port of the evaporator 10.

The controller 7 is configured by a known microcomputer including a CPU which performs control processing and arithmetic processing and storage circuits such as a ROM and RAM for storing programs and data. The controller 7 is configured by an output circuit that outputs for control signals or control voltages to various devices to be controlled, an input circuit to which detection signals from various sensors are input, a power supply circuit, and the like.

To an output side of the controller 7, the low-pressure side inverter for driving the low-pressure side electric motor 1$m$, the high-pressure side inverter for driving the high-pressure side electric motor 2$m$, the condenser fan 3$f$, the evaporator fan 10f, and the like are connected as the devices to be controlled. The controller 7 controls actuation of the devices to be controlled.

Therefore, a rotation speed of the low-pressure side electric motor 1m and the rotation speed of the high-pressure side electric motor 2m can be controlled respectively and independently of each other by a first discharge capacity control section and a second discharge capacity control section in the controller 7. It is of course possible to respectively form the first and second discharge capacity control sections as controllers separate from the controller 7.

On the other hand, an input side of the controller 7 receives the detection signals from the sensors. The sensors include an outside air temperature sensor that is an outside air temperature detection portion for detecting an outside air temperature Tam of outside air (i.e., exterior air) for exchanging heat with the high-pressure refrigerant in the condenser 3. The sensors also include an inside temperature sensor which is an inside temperature detecting portion for detecting an air temperature Tfr of the blown air for exchanging heat with the low-pressure refrigerant in the evaporator 10.

Furthermore, an operation panel 8 is connected to the input side of the controller 7. The operation panel 8 is provided with various switches such as an actuation switch, a stop switch, a temperature setting switch, and a high performance command switch. The operation panel 8 is further provided with a display portion for displaying a set temperature, an inside temperature, and the like. The actuation switch is a request signal output section that outputs an actuation request signal for the refrigerator. The stop switch is a request signal output section that outputs a stop request signal. The temperature setting switch is a target temperature setting section that sets the inside temperature (i.e., target cooling temperature) Tset.

The controller 7 calculates a required performance level using a signal from the operation panel 8, various values from various sensor, a door opening/closing signal etc., and controls the inverters depending on the required performance level to control the refrigerant discharge capacity of the compressor, an opening degree of the expansion valve, and the air volume from the fan. According to the second embodiment, a comparison between the COP improving operation mode and the high performance operation mode at the outside air temperature of 38° C. and at the inside temperature of −18° C. is similar to that shown in FIG. 6.

Third Embodiment

Figure 8:
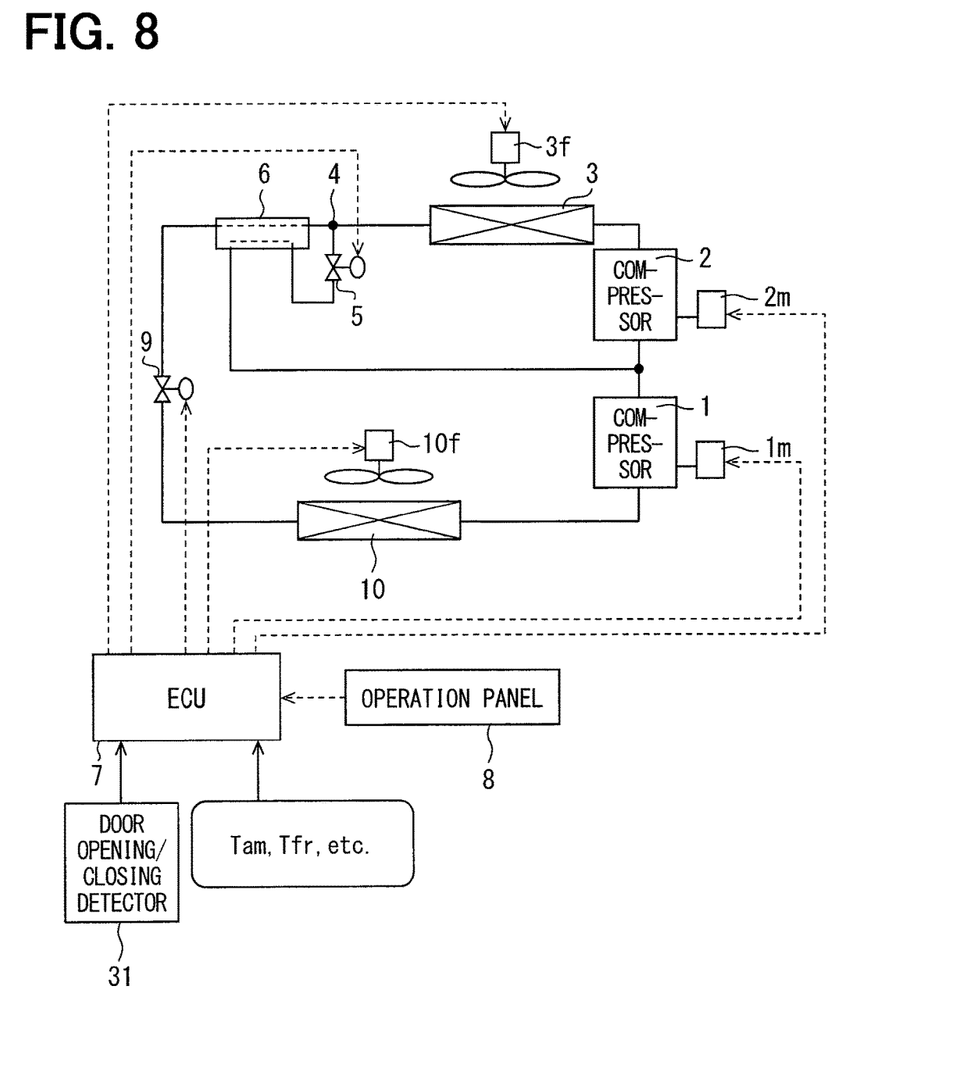
FIG. 8 is an overall configuration diagram of a two-stage pressure buildup refrigeration cycle apparatus in a third embodiment.

Next, a third embodiment will be described. In FIG. 8, the two-stage pressure buildup refrigeration cycle apparatus includes a door opening/closing detector 31 that detects an opening or closing of a door of the interior to be cooled by an evaporator 10. A signal from the door opening/closing detector 31 is led to a controller 7.

Figure 9:
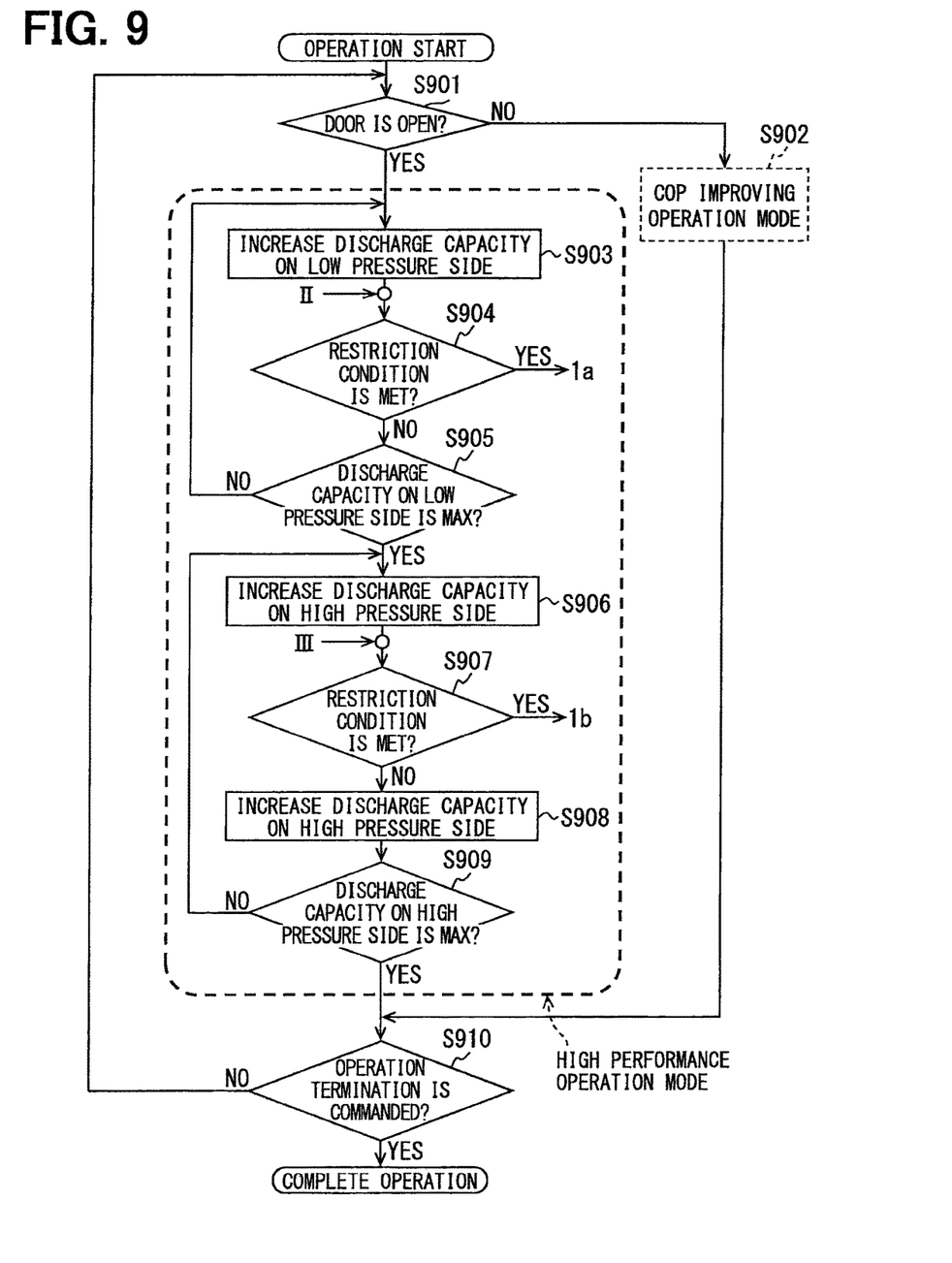
FIG. 9 is a flowchart showing control by a controller in the above-described third embodiment.

The controller 7 determines, at S901 shown in FIG. 9, whether the door is open based on the signal from the door opening/closing detector 31. When the door is determined to be open at S901, the low-pressure side compressor 1 and the high-pressure side compressor 2 are controlled in the high performance operation mode (S903 to S909).

On the other hand, the controller 7 operates the low-pressure side compressor 1 and the high-pressure side compressor 2 in the COP improving operation mode at S902 when the door is determined to be closed at S901.

When the door of the interior that is the cooling target space to be cooled is closed, rapid cooling is unnecessary. Therefore, the control in the high performance operation mode is stopped, and the COP improving operation mode is performed. In this way, it is possible to enhance efficiency to achieve energy saving.

Fourth Embodiment

Next, a fourth embodiment will be described. An operation panel 8 in the present embodiment includes an operation command switch that outputs an operation command in the high performance operation mode. The operation command switch is configured by a push button, for example.

Figure 10:
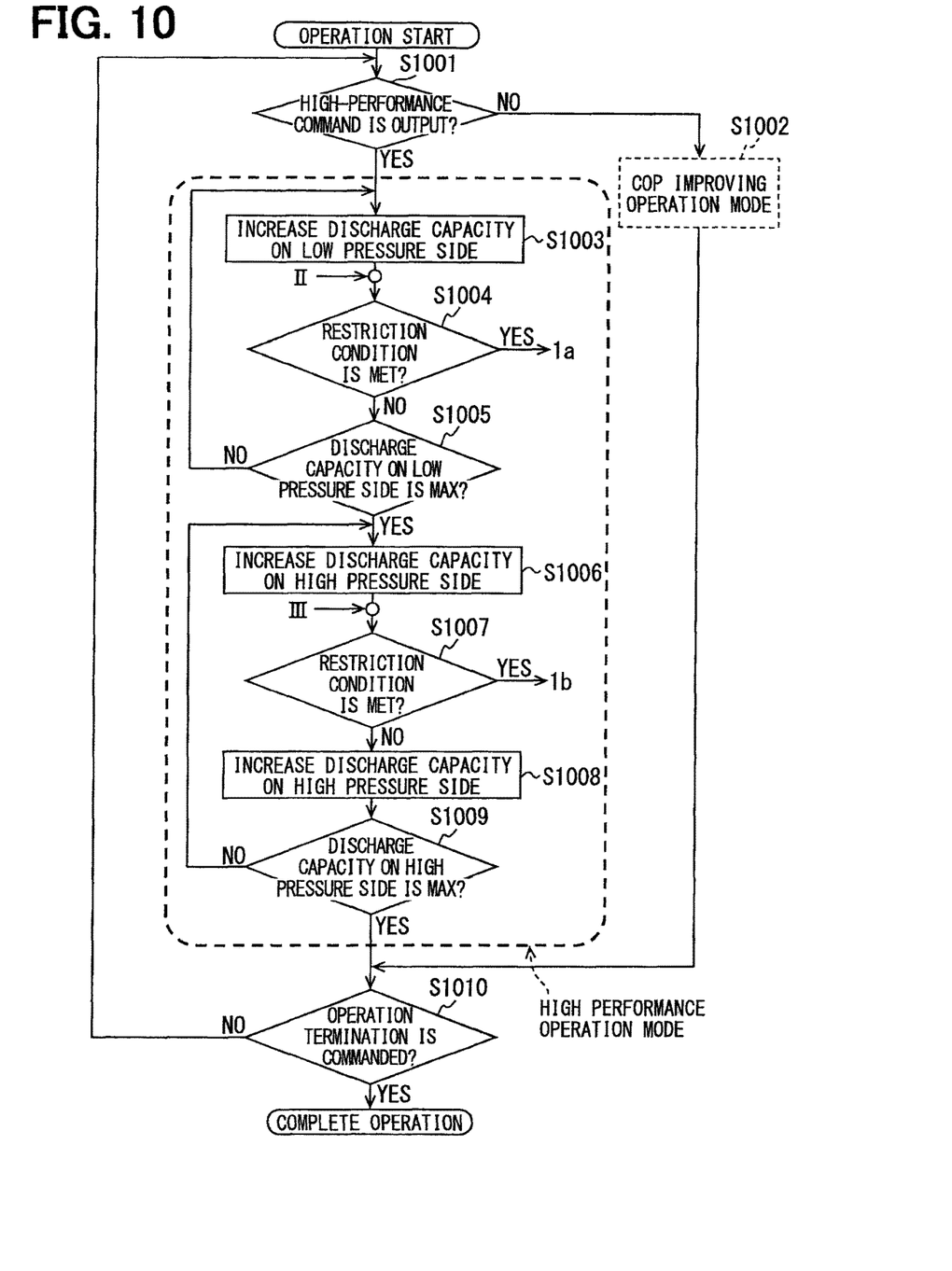
FIG. 10 is a flowchart showing control by a controller in a fourth embodiment.

When the operation command switch is operated, the controller 7 determines, at S1001 shown in FIG. 10, that the operation command (also referred to as high-performance command) in the high performance operation mode is output. In this case, the controller 7 operates the low-pressure side compressor 1 and the high-pressure side compressor 2 in the high performance operation mode by processing S1003 to S1009.

The controller 7 operates the low-pressure side compressor 1 and the high-pressure side compressor 2 in the COP improving operation mode at S1002 when it is determined, at S1001, that the operation command in the high performance operation mode is output from the operation panel 8.

In this manner, rapid cooling is unnecessary unless the operation command in the high performance operation mode is output from the operation panel 8, and therefore the control in the high performance operation mode is stopped, and the control in the COP improving operation mode is performed. In this way, it is possible to enhance efficiency to achieve energy saving.

(Other Modifications)

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The present disclosure is intended to cover various modifications and equivalent arrangements within the scope of the present disclosure.

Although the cycle configuration employing the intermediate heat exchanger 6 has been described in each of the above-described embodiments, the cycle configuration of the two-stage pressure buildup refrigeration cycle apparatus in the present disclosure is not limited to it. For example, the intermediate heat exchanger 6 may not be provided and an intermediate gas-liquid separator for separating refrigerant flowing out of an auxiliary expansion valve 5 into gas and liquid may be provided.

Gas-phase refrigerant separated by the intermediate gas-liquid separator may be drawn into a high-pressure side compressor 2. In this case, the auxiliary (i.e., intermediate-pressure) expansion valve 5 may not be provided and a solenoid valve circuit for selecting a fixed throttle or a refrigerant passage passing through a fixed throttle may be employed instead. Therefore, the auxiliary expansion valve 5 in the present disclosure includes these replacements.

Moreover, the branch portion 4 may not be provided and an economizer refrigeration cycle device in which liquid-phase refrigerant separated by an intermediate gas-liquid separator flows into a main expansion valve 9 may be configured.

The economizer refrigeration cycle device includes a heat radiator (i.e., the condenser) and an intermediate-pressure expansion valve (i.e., the auxiliary expansion valve). The heat radiator radiates heat of high-pressure refrigerant discharged from a high-pressure side compression mechanism. The intermediate-pressure expansion valve decompresses and expands part of the high-pressure refrigerant flowing out of the heat radiator into an intermediate-pressure refrigerant. Intermediate-pressure refrigerant decompressed in the intermediate-pressure expansion valve is led to a suction side of the high-pressure side compression mechanism.

In each of the above-described embodiments, the thermal expansion valves are employed as the auxiliary expansion valve 5 and the main expansion valve 9. However, electric expansion valves may be employed as the auxiliary expansion valve 5 and the main expansion valve 9.

Although the two-stage pressure buildup refrigeration cycle apparatus in the present disclosure is applied to the refrigerator in each of the above-described embodiments, the present disclosure is not limited to this application. For example, the present disclosure may be applied to an air conditioner, a refrigerating chamber, and the like.

Although it is determined whether high performance is required by comparing an absolute value of a deviation ΔT of the temperature with the reference temperature deviation ΔKT at S201 in FIG. 2 or the like, a method of determination is not limited to it.

For example, after the actuation switch is thrown (turned on), control for determining rotation speeds of both the compressors 1 and 2 may be performed so as to reduce a difference between the air temperature Tfr and the target cooling temperature Tset. In this case, when a temperature change amount ΔTfr of the air temperature Tfr per unit time is greater than a predetermined reference temperature change amount ΔKTfr, it is determined that the refrigerator has just started. On the other hand, when the temperature change amount ΔTfr is equal to or smaller than the reference temperature change amount ΔKTfr, it is determined that the refrigerator is in a steady state and a COP improving operation mode is performed. As a refrigerant temperature, a surface temperature of a refrigerant pipe may be used.

The respective compressors 1 and 2 are driven by separate electric motors (i.e., drive portions) in each of the above-described embodiments. However, both of a high-pressure side compressor 2 and a low-pressure side compressor 1 may be driven by a single drive portion. As the drive portion, an engine (i.e., an internal combustion engine) may be employed. As the motor for rotating the compressor of the electric compressor, a DC brushless motor may be used to further enhance efficiency besides an induction motor.

What is claimed is:

1. A two-stage pressure buildup refrigeration cycle apparatus comprising:
    a low-pressure side compressor that compresses a refrigerant at a low pressure to be a refrigerant at an intermediate pressure and discharges the refrigerant at the intermediate pressure;
    a high-pressure side compressor that compresses the refrigerant at the intermediate pressure discharged from the low-pressure side compressor to be a refrigerant at a high pressure and discharges the refrigerant at the high pressure;
    a condenser that performs a heat exchange between the refrigerant at the high pressure discharged from the high-pressure side compressor and outside air, and induces the refrigerant at the high pressure to radiate heat;
    a main expansion valve that decompresses and expands the refrigerant at the high pressure flowing out of the condenser to be the refrigerant at the low pressure;
    an auxiliary expansion valve that decompresses the refrigerant at the high pressure flowing out of the condenser and guides the refrigerant to a suction side of the high-pressure side compressor;
    an evaporator that performs a heat exchange between the refrigerant at the low pressure decompressed in the main expansion valve and blown air to be blown into an interior as a cooling target space, evaporates the refrigerant at the low pressure, and guides the refrigerant at the low pressure to flow to a suction side of the low-pressure side compressor;
    a condenser fan that blows the outside air toward the condenser;
    an evaporator fan that blows air for cooling the interior toward the evaporator; and
    a controller that controls the low-pressure side compressor, the high-pressure side compressor, the condenser fan, and the auxiliary expansion valve, wherein
    the controller
        controls, for improving a COP, the low-pressure side compressor and the high-pressure side compressor in a COP improving operation mode in which a refrigerant discharge capacity of one of the low-pressure side compressor and the high-pressure side compressor is set based on a refrigerant discharge capacity of another of the low-pressure side compressor and the high-pressure side compressor, when a lower cooling capacity is required, and
        controls the low-pressure side compressor and the high-pressure side compressor in a high performance operation mode in which a refrigerant discharge capacity of the high-pressure side compressor is increased after increasing a refrigerant discharge capacity of the low-pressure side compressor, when a higher cooling capacity greater than the lower cooling capacity is required, and
    the controller
        increases the refrigerant discharge capacity of the low-pressure side compressor after dissolving a restriction condition when the restriction condition is met in the high performance operation mode, the restriction condition in which an increase of the refrigerant discharge capacity of the low-pressure side compressor is restricted in the high performance operation mode, and
        increases the refrigeration discharge capacity of the high-pressure side compressor after dissolving a restriction condition when the restriction condition is met in the high performance operation mode, the restriction condition in which an increase of the refrigerant discharge capacity of the high-pressure side compressor is restricted in the high performance operation mode.

2. The two-stage pressure buildup refrigeration cycle apparatus according to claim 1, wherein
    the controller increases an opening degree of the auxiliary expansion valve or increases an air volume blown by the condenser fan to dissolve the restriction condition restricting the increase of the refrigerant discharge capacity of the low-pressure side compressor when the restriction condition is met while the refrigerant discharge capacity of the low-pressure side compressor increasing, and the restriction condition restricting the increase of the refrigerant discharge capacity of the high-pressure side compressor when the restriction condition is met while the refrigerant capacity of the high-pressure side compressor increasing.

3. The two-stage pressure buildup refrigeration cycle apparatus according to claim 2, wherein
the restriction condition restricting the increase of the refrigerant discharge capacity of the low-pressure side compressor and the restriction condition restricting the increase of the refrigerant discharge capacity of the high-pressure side compressor are met when a temperature of the refrigerant at the high pressure exceeds a predetermined upper limit temperature, when a pressure of the refrigerant at the high pressure exceeds a predetermined upper limit pressure, or when a driving current for driving an electric compressor configuring the low-pressure side compressor or the high-pressure side compressor exceeds a predetermined upper limit current.

4. The two-stage pressure buildup refrigeration cycle apparatus according to claim 1, further comprising
an intermediate heat exchanger that performs a heat exchange between the refrigerant at the high pressure flowing out of the condenser and the refrigerant decompressed in the auxiliary expansion valve, wherein
the auxiliary expansion valve decompresses and expands one flow of flows of the refrigerant at the high pressure divided in a branch portion that divides the refrigerant at the high pressure flowing out of the condenser, and guides the one flow to the intermediate heat exchanger,
the main expansion valve decompresses and expands another flow of the flows of the refrigerant at the high pressure divided in the branch portion and cooled by the intermediate heat exchanger, and
the refrigerant after passing through the auxiliary expansion valve and the intermediate heat exchanger flows into the suction side of the high-pressure side compressor.

5. The two-stage pressure buildup refrigeration cycle apparatus according to claim 1, wherein
the controller, in the high performance operation mode, increases the refrigerant discharge capacity of the high-pressure side compressor after increasing the refrigerant discharge capacity of the low-pressure side compressor to a maximum.

6. The two-stage pressure buildup refrigeration cycle apparatus according to claim 1, wherein
the controller
controls the low-pressure side compressor and the high-pressure side compressor in the COP improving operation mode when an absolute value of a temperature deviation between an air temperature in the interior as the target space and a target cooling temperature is smaller than a reference temperature deviation set in advance, and
controls the low-pressure side compressor and the high-pressure side compressor in the high performance operation mode when the absolute value of the temperature deviation is larger than or equal to the reference temperature deviation.

7. The two-stage pressure buildup refrigeration cycle apparatus according to claim 1, further comprising
a door opening/closing detector that detects an opening or closing of a door of the interior to be cooled by the evaporator, wherein
the controller controls the low-pressure side compressor and the high-pressure side compressor in the COP improving operation mode when the door is determined to be closed based on a signal from the door opening/closing detection portion, and
the controller controls the low-pressure side compressor and the high-pressure side compressor in the high performance operation mode when the door is determined to be open based on a signal from the door opening/closing detection portion.

8. The two-stage pressure buildup refrigeration cycle apparatus according to claim 1, further comprising
an operation panel that outputs an operation command to the controller to perform the high performance operation mode, wherein
the controller
controls the low-pressure side compressor and the high-pressure side compressor in the COP improving operation mode when the operation command for performing the high performance operation mode is not output from the operation panel and
controls the low-pressure side compressor and the high-pressure side compressor in the high performance operation mode when the operation command for performing the high performance operation mode is output from the operation panel.

9. The two-stage pressure buildup refrigeration cycle apparatus according to claim 3, wherein
the controller
increases a rotation speed of the condenser fan or increases an opening degree of the auxiliary expansion valve when a temperature of the refrigerant at the high pressure exceeds the predetermined upper limit temperature and thereby the restriction condition restricting the increase of the refrigerant discharge capacity of the low-pressure side compressor or the restriction condition restricting the increase of the refrigerant discharge capacity of the high-pressure side compressor is met and
increases a rotation speed of the condenser fan when a driving current for the low-pressure side compressor or the high-pressure side compressor exceeds the predetermined upper limit current and thereby the restriction condition restricting the increase of the refrigerant discharge capacity of the low-pressure side compressor or the restriction condition restricting the increase of the refrigerant discharge capacity of the high-pressure side compressor is met.

10. The two-stage pressure buildup refrigeration cycle apparatus according to claim 9, wherein
the controller increases a rotation speed of the condenser fan when a pressure of the refrigerant at the high pressure exceeds the predetermined upper limit pressure and thereby the restriction condition restricting the increase of the refrigerant discharge capacity of the low-pressure side compressor or the restriction condition restricting the increase of the refrigerant discharge capacity of the high-pressure side compressor is met.

* * * * *